UNITED STATES PATENT OFFICE.

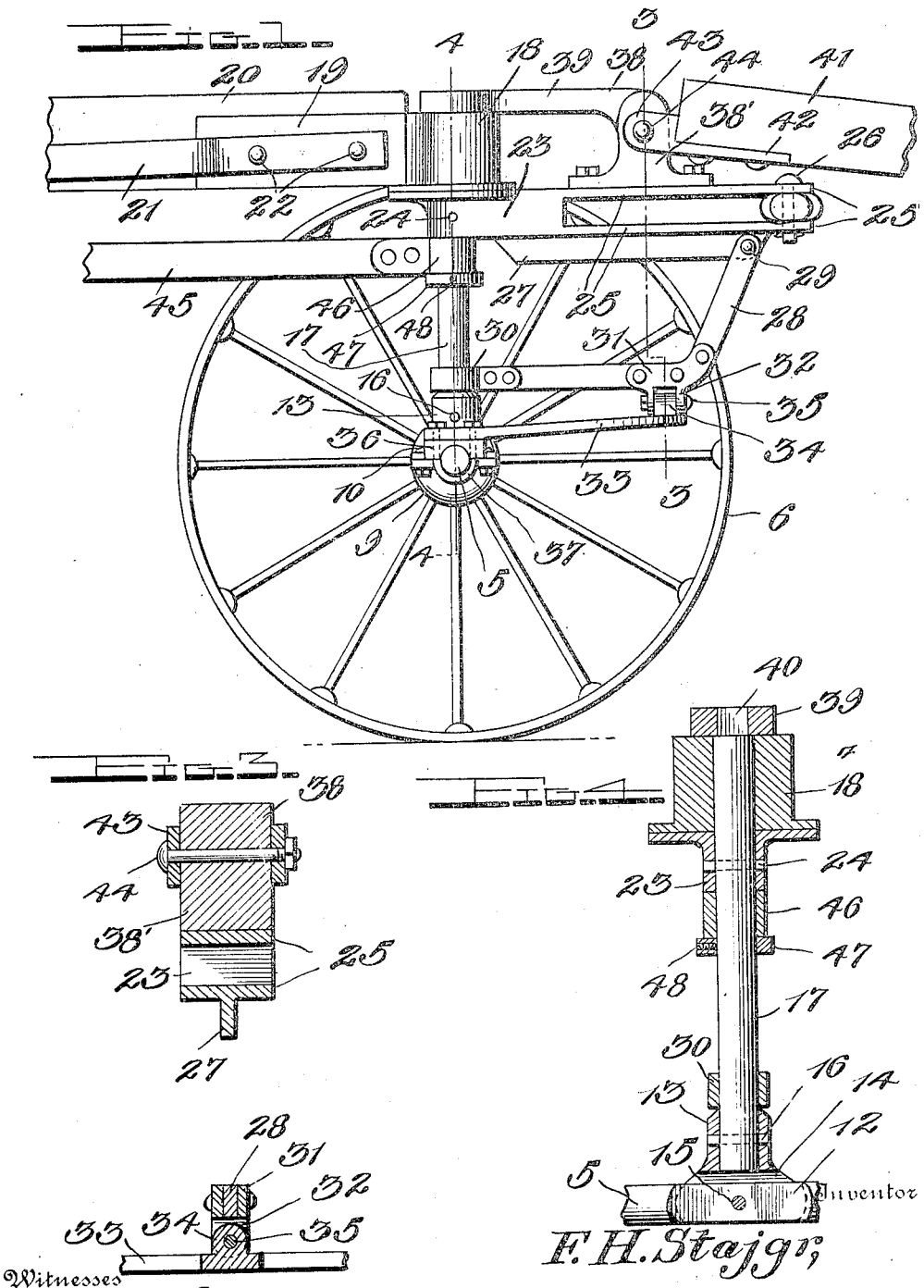

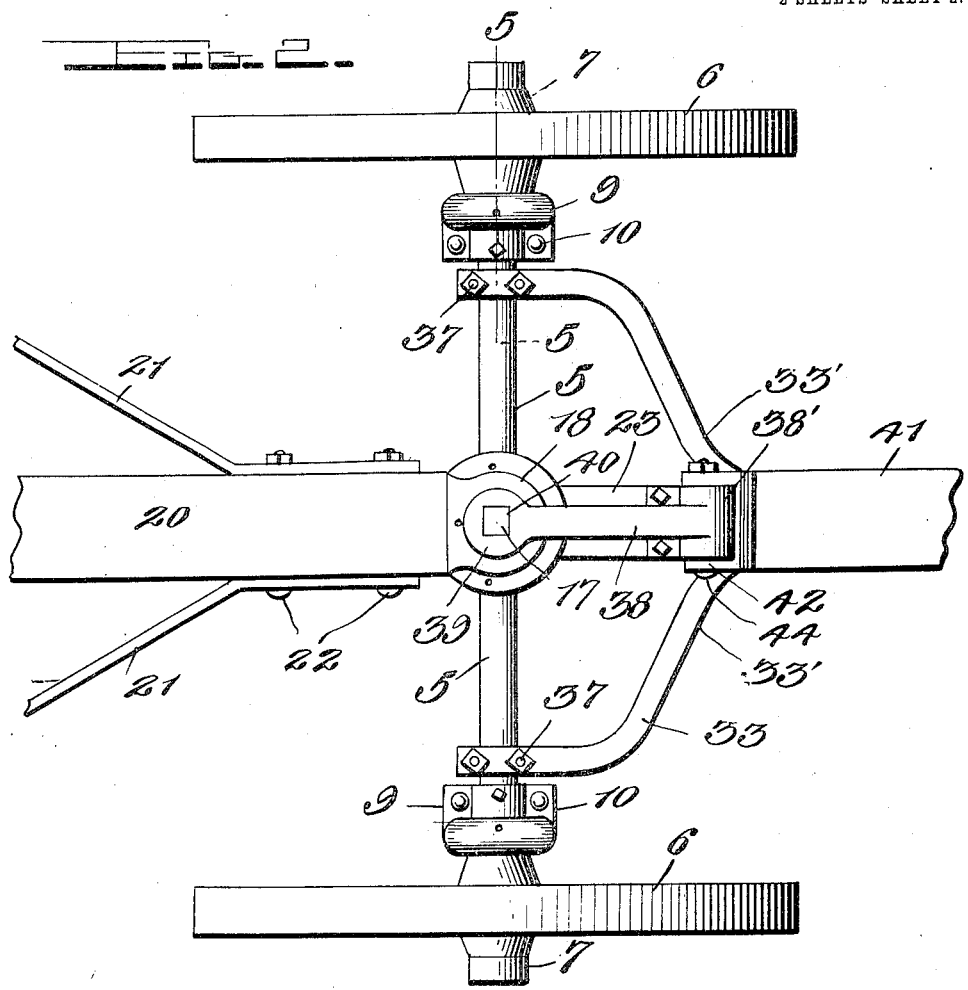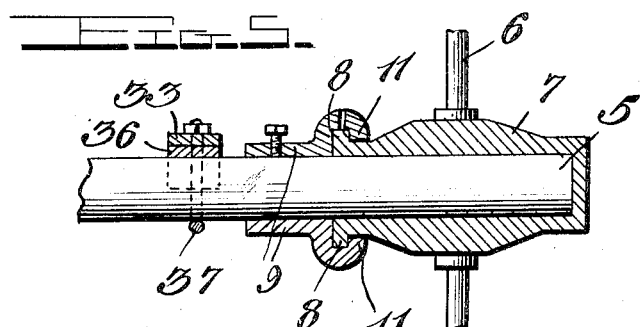

FRANK H. STAJGR, OF WYNDMERE, NORTH DAKOTA.

TONGUE-TRUCK.

1,047,324.

Specification of Letters Patent. Patented Dec. 17, 1912.

Application filed March 11, 1912. Serial No. 682,904.

*To all whom it may concern:*

Be it known that I, FRANK H. STAJGR, a citizen of the United States, residing at Wyndmere, in the county of Richland and State of North Dakota, have invented certain new and useful Improvements in Tongue-Trucks, of which the following is a specification, reference being had to the accompanying drawings.

This invention relates to improvements in tongue trucks and has for its object to provide means whereby the truck may be easily and quickly attached to or detached from the end of a stub pole which extends forwardly from the frame or body of the vehicle.

Another object of the invention is to provide a tongue supporting truck which is more particularly designed for application to seed drills, harvesters, cultivators and similar agricultural machines whereby the wheel axle may oscillate or tilt in a vertical plane without causing a corresponding tilting movement of the draft tongue, whereby the animals are relieved of additional draft in the movement of the machine over obstructions or an uneven grade surface.

Still another object of the invention is to provide a tongue supporting truck which is extremely light, and may be readily turned to guide the machine, said truck being so constructed that the use of a draft tongue may be dispensed with if desired.

With the above and other objects in view, the invention consists of the novel features of construction, combination and arrangement of parts hereinafter fully described and claimed, and illustrated in the accompanying drawings, in which—

Figure 1 is a side elevation of a tongue supporting truck embodying the present invention, one of the truck wheels being removed; Fig. 2 is a top plan view; Fig. 3 is a section taken on the line 3—3 of Fig. 1; Fig. 4 is a section taken on the line 4—4 of Fig. 1; and Fig. 5 is a section taken on the line 5—5 of Fig. 2.

Referring in detail to the drawings 5 designates the truck axle upon the ends of which the supporting wheels 6 are revolubly mounted. These supporting wheels are provided with hubs 7 the outer ends of which are closed, the inner ends of said hubs being provided with an annular flange 8. Retaining sleeves 9 are formed in two sections as shown in Fig. 5 and are securely bolted to the axle 5 as indicated at 10. These sleeve sections are formed with the lips 11 which engage over the flange 8 on the inner end of the wheel hub. In this manner an absolutely dust-proof hub for the wheel is obtained. It is understood, of course, that the retaining sleeve sections loosely engage the flanges on the inner ends of the hubs so as to permit of the free rotation of the truck wheels upon the ends of the axle.

The axle 5 is provided with a central rectangular portion indicated at 12 upon opposite sides of which the parallel depending ears or flanges 14 formed on the lower end of a sleeve 13 are disposed. A pivot bolt 15 extends through the square or rectangular portion of the axle and through the ears 14, said axle being rotatable upon said pivot bolt so that the same may oscillate in a vertical plane. The sleeve 13 is rigidly secured by means of a bolt 16 to the lower end of a perpendicular rod 17 which is rotatably mounted in a bearing 18. This bearing is provided with parallel longitudinally disposed arms 19 which engage upon opposite sides of a stub tongue or pole 20 which is fixed to the frame of the grain drill, harvester or other machine in any preferred manner. The inwardly extending inclined brace bars 21 are also secured to the machine frame and have their forward ends disposed upon the arms 19 of the bearing member 18. Fastening bolts 22 are disposed through the pole 20 and said arms and brace bars to rigidly secure the same to said pole.

A longitudinally disposed draft beam 23 is rigidly fixed by means of the bolt 24 at its inner end to the perpendicular rod 17, said inner end of the draft beam being disposed beneath the bearing 18. The forwardly extending portion of this beam consists of the spaced parallel plates 25 between which the doubletrees or other draft connections are adapted to be engaged, said doubletree being retained in position therebetween by means of the pivot bolt 26. The bottom plate 25 of the draft beam has a longitudinally extending depending web 27 formed thereon to the outer or forward end of which the end of the forwardly and upwardly inclined leg of an angular bar 28 is securely bolted or riveted as indicated at 29. The other leg of this bar is horizontally disposed and extends rearwardly. To the rear end of this horizontal portion of the bar 28 a sleeve or collar 30 is secured, said sleeve loosely surrounding the rod 17. At the point of connection of the horizontal and inclined arms of the bar 28 a bracket plate 31 is secured, said plate being provided with depending ears 32. A substantially U-shaped horizontally disposed bar 33 is provided with a central intermediate forwardly extending looped portion 33' upon which a lug 34 is secured. This lug is adapted to be disposed between the ears 32 of the bracket plate, said ears and lug being provided with coinciding openings to receive a pivot bolt 35. The ends of the bar 33 extend over the axle 5 and rest upon a clamping block 36 which extends around the axle beneath the same. Clip bolts 37 are disposed through the ends of the bar 33 and clamping block to rigidly and securely clamp the ends of the bar to the axle.

A member 38 is arranged upon the beam 23, said member being provided with a base or body 38' which is securely bolted to the upper forwardly extending plate 25 of said bottom. This member is provided with a rearwardly extending arm 39 disposed in parallel relation to the draft beam and provided in its end with a rectangular opening to receive the upper reduced rectangular end portion 40 of the perpendicular rod 17. The tongue 41 is provided upon its end with an attaching plate 42 having spaced ears 43 formed thereon to engage upon opposite sides of the body of the member 38 to which said ears are connected by means of the pivot bolt 44. As an additional brace or support for the perpendicular rod 17 I provide the longitudinally disposed bar 45 fixed at its rear end to the machine frame and carrying a sleeve 46 at its forward end which is loosely engaged upon said rod. A collar 47 is arranged upon the rotatable rod 17 beneath said sleeve and is rigidly fixed to the rod by means of a set screw 48. This collar serves to effectually hold the sleeve 46 in position beneath the inner end of the draft beam 23 and prevent its downward movement upon the rod 17.

From the foregoing it will be seen that by means of my improved truck construction and manner of attaching the same to the draft pole of the machine, the wheel carrying axle has free vertical oscillatory movement, which movement will not be transmitted to the draft beam 23 or the tongue 41 so that the supporting wheels may move over obstructions without subjecting the draft animals to additional labor.

It will be obvious that if desired the draft tongue 41 may be dispensed with, and the animal simply connected to the forward end of the beam 23.

The elements employed for attaching the draft beam to the vertically disposed rotatable rod 17 insure a maximum of strength and working efficiency for said beam when the device is employed in connection with harvesters, cultivators and other heavy agricultural machines.

The device is as a whole extremely simple in its construction and the tongue supporting truck may be easily and quickly arranged and properly connected to the draft pole.

While I have shown and described the preferred construction and arrangement of the various elements, it will be obvious that the invention is susceptible of considerable modification without departing from the essential feature or sacrificing any of the advantages thereof.

Having thus described the invention what is claimed is:—

1. In a tongue supporting truck, the combination of a vehicle axle and supporting wheels revolubly mounted upon the ends thereof, a draft pole, a depending rod rotatably mounted on the forward end of said pole, said axle being mounted at its central portion upon the lower end of said rod for vertical oscillatory movement, a draft beam rigidly fixed at its rear end to the rod, a bar secured to the forward end of said draft beam and loosely engaged upon the rod at its rear end, and a supporting bar fixed at its ends to the axle, said first named bar being pivotally connected to the intermediate portion of the supporting bar to permit of the oscillatory movement of the axle independently of the beam.

2. In a tongue supporting truck, the combination of an axle and supporting wheels revolubly mounted on the ends thereof, a draft pole, a perpendicular rod and means for rotatably mounting the rod at its upper end on the forward end of said draft pole, means arranged on the lower end of said rod for removably connecting said axle thereto at its intermediate portion for vertical oscillatory movement, a draft beam fixed at its rear end to said rod, said beam having a depending longitudinal web, an angular bar, rigidly connected at one end to the forward end of said web, the rear end of said bar being loosely mounted upon the lower end of said rod, and a horizontally disposed substantially U-shaped supporting plate rigidly fixed at its ends upon the axle and pivotally connected intermediate of its ends to said angular bar to permit of the oscillatory movement of the axle independently of the beam.

3. In a tongue supporting truck, the combination of an axle and supporting wheels revolubly mounted upon the ends thereof, a draft pole, connecting means between the central portion of the axle and said draft pole whereby the axle may oscillate in a vertical plane, a forwardly extending draft beam fixed at its rear end to said connecting means, means for bracing the forward end of the beam from the axle while permitting of the oscillation of the axle independently of the beam, a member fixed upon said draft beam intermediate of its ends and connected to said connecting means between the axle and draft pole, and means for connecting a draft tongue to said member.

In testimony whereof I hereunto affix my signature in the presence of two witnesses.

FRANK H. STAJGR.

Witnesses:
T. E. RILEY,
LARS OSGARD.